June 4, 1929.  M. HAINES  1,715,499
LIQUID LEVEL SIGNAL
Filed July 28, 1925
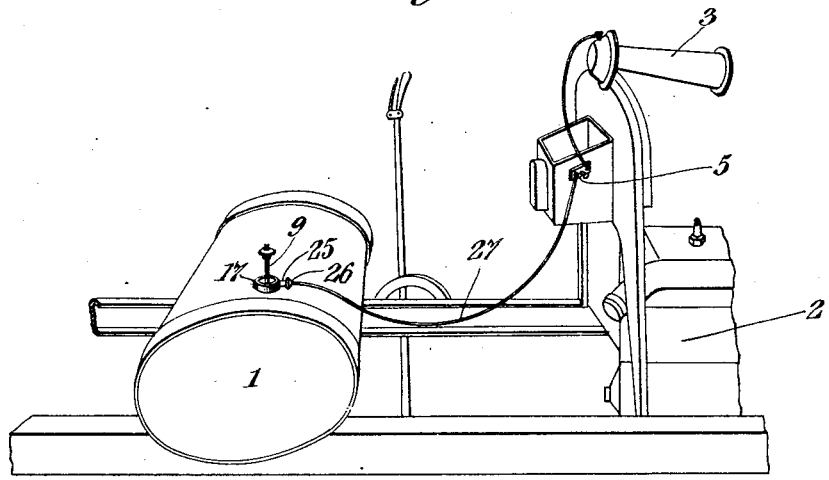
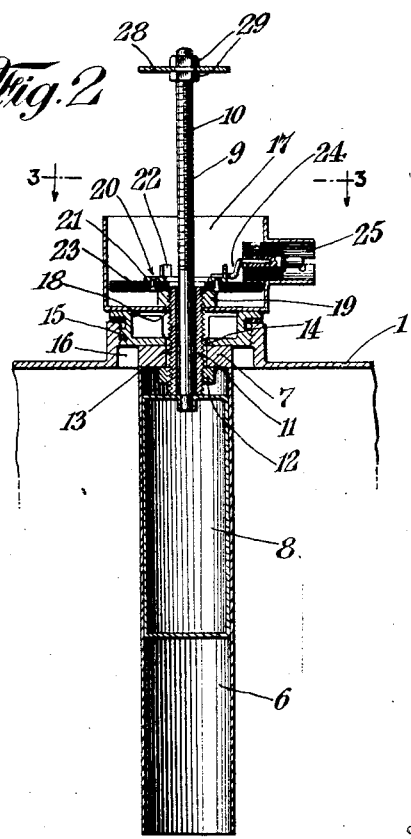
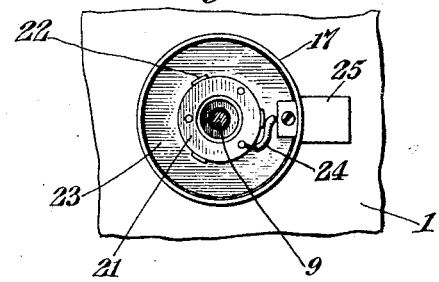
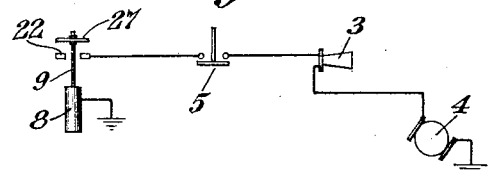
Inventor
Merl Haines
By his Attorneys
Prindle, Wright, Neal & Bean Patented June 4, 1929.

1,715,499

UNITED STATES PATENT OFFICE.

MERL HAINES, OF MAYFIELD, NEW YORK, ASSIGNOR OF ONE-THIRD TO HOWARD A. SHELDON AND ONE-THIRD TO HARRY A. COLE, BOTH OF GLOVERSVILLE, NEW YORK.

LIQUID-LEVEL SIGNAL.

Application filed July 28, 1925. Serial No. 46,520.

This invention relates to improvements in liquid level signal and the principal object of the invention is the production of a device which will automatically indicate and sound an alarm when the level of a liquid within a tank or other suitable reservoir reaches a predetermined low level.

A further object of this invention is the production of a device of this character which is adjustable so as to provide for different operating conditions, which is simple in construction and effective in operation and which may be readily installed in tanks or other reservoirs at present in use and which is particularly adapted for use in connection with motor vehicles of all kinds.

Another object is the provision of a device of this kind which is adapted to be operatively connected in an electric generating circuit of a motor vehicle, this circuit being closed when the level of the liquid reaches a predetermined level, and an alarm or signal being included in the circuit and being sounded when the circuit is closed. Further objects include improvements in details of construction and operation whereby a simple and effective device of the character herein described is produced.

To the accomplishment of the foregoing and such other objects as may hereinafter appear this invention consists in the construction, combination and arrangement of parts hereinafter described and then sought to be defined in the appended claims, reference being had to the accompanying drawings forming a part hereof and which show, merely for the purpose of illustrative disclosure, a preferred embodiment of this invention, it being expressly understood, however, that various changes may be made in practice without digressing from my invention as defined in the claims.

In the drawings—

Figure 1 represents a perspective view of a device embodying this invention mounted on the chassis of a motor vehicle.

Figure 2 is a vertical cross section through the operating parts of the device itself.

Figure 3 is a top plan view of the device shown in Figure 2 looking down substantially from line 3—3 of Figure 2.

Figure 4 is a diagrammatic view of the electric circuit involved.

Referring first to Figure 1, the numeral 1 designates a tank or other reservoir containing a liquid. This has the usual feed lines or pipes for conveying the liquid to the motor 2 but these are not shown as they form no part of this invention. The numeral 3 designates a horn which is the form of signal or alarm chosen to illustrate this invention. One side of this horn 3 is connected to the generator 4 of the motor vehicle, shown diagrammatically in Figure 4 only, and the other side of the horn is connected to a hand switch 5 and the other side of this hand switch 5 is connected to the device itself as presently described.

Referring now particularly to Figure 2 of the drawings, the operating parts of the device include a tube or cylinder 6 closed at its upper end at 7 and adapted to slidably receive a float member 8. A stem or rod 9 is connected to the upper end of the float member 8 and is screw-threaded as at 10 for a portion of its length. Loosely mounted on the rod or stem 9 is the securing nipple 11 which is screw-threaded on its outer side and provided with a nut 12 near its lower end which is adapted to abut against the under side of the closed end of the tube or cylinder 6. The nipple 11 with the stem 9 extending therethrough both extend through an opening 13 in the end 7 of the cylinder or tube 6 and also through an opening 14 in a cap or closure 15, which is adapted to fit by means of screw threads or the like an opening 16 into the tank or other reservoir 1.

A switch box 17 is mounted on top of said cap or closure 15 and is provided with an aperture 18 through the bottom to receive the nipple 11 and the stem 9 extending therethrough. A nut or similar securing means 19 is positioned within said switch box and screwed down upon the upper end of the nipple 11 whereby the tube or cylinder 6, cap or cover 15 and switch box 17 are assembled or secured together so as to form a unitary structure insertable and removable as a whole from the opening 16 into the tank or other reservoir.

The switch box has one switch member 20 mounted therein and this takes the form of a ring 21 having a plurality of contact points or prongs 22. Three of these are shown in the drawing but this number may be varied. This switch ring 21 and the contact points or prongs 22 are suitably insulated from all parts of the device as indicated by the disc 23 except that the ring 21 has an electrical connection 24 to an electrical connecting socket 25. This socket is adapted to receive a plug 26 which is on the end of the conductor 27 leading to one side of the switch 5 as previously described. It is seen that when the switch 5 is closed the ring 21 and the contact points or prongs 22 are in electrical communication with the horn 3 and through the horn to the generator 4 but are insulated and electrically disconnected from a ground.

The rod or stem 9 in its uppermost position extends a considerable distance above the switch box 17 and is provided on its upper end with a switch or contact plate 28 which is adjustably secured on the threaded portion of said rod or stem 9 by means of the nuts or other suitable means 29. Due to the metallic connections between the switch or contact plate 28, the rod or stem 9, the nipple 11, switch box 17, cap or cover 15, float 8, tube or cylinder 6 and tank or reservoir 1, said switch or contact plate 28 is grounded to the frame or chassis of the motor vehicle. Therefore when the float member descends low enough the switch or contact plate 28 will contact with the points or prongs 22, thereby completing the circuit from the generator 4 through the horn 3, the switch 5, to ground and cause the sounding of the horn or other signal. This circuit may be broken at any time by opening the hand switch 5 which will cause the horn or other signal to discontinue sounding.

As stated, the tube or cylinder 6 is adapted to be mounted within a tank or other suitable reservoir 1 and the float 8 is within the tube and its position is controlled by the level of the liquid within the tank or other reservoir. When the tank or reservoir is full or partially full the float will be in a raised position and as the level of the liquid lowers, the float will drop until, having reached a predetermined low level, the switch or contact plate or disc 28 will contact with the points or prongs 22 and close the circuit as previously described. The level at which this is accomplished is determined by the various adjustments provided. It is to be noted that the alarm will sound only when the generator is operated so that, should the tank or reservoir spring a leak or the fluid therewithin reach its low level from any cause, the alarm or signal will not sound unless the generator is operating, and that of course means that the motor is operated. This does away with the disadvantage of having a device which might operate when the vehicle is not occupied or the motor is not under supervision.

The device shown in Figure 2 as a whole is adapted to be inserted and removed bodily from the opening into the tank or other reservoir 1 and is adapted to be furnished as an accessory and may be readily installed upon standard motor vehicles of various kinds, the installation being a very simple matter.

What I claim is:—

1. A device of the character described including in combination, a tube having a float slidably mounted therein, a cap member on top of said tube adapted to be attached to an inlet opening into a tank or other reservoir, a switch box on top of said cap, means for connecting said switch box and said tube, said float having a stem extending through said cap and through said switch box, said switch box having one contact member adapted to be positioned in an electric circuit, including an audible signal, a contact member operatively connected to said stem so as to make contact with said first contact member when the float reaches a predetermined low position.

2. A device of the character described including in combination, a tube having a float slidably mounted therein, a cap member on top of said tube adapted to be attached to an inlet opening into a tank or other reservoir, a switch box on top of said cap, means for connecting said switch box and said tube, said float having a stem extending through said cap and through said switch box, said switch box having one contact member adapted to be positioned in an electric circuit, including an audible signal, a contact member operatively connected to said stem so as to make contact with said first contact member when the float reaches a predetermined low position, and means for adjusting the position of said last-mentioned contact member.

3. A device of the character described including in combination, a tube having a float slidably mounted therein, a cap member on top of said tube adapted to be attached to an inlet opening into a tank or other reservoir, a switch box on top of said cap, means for connecting said switch box and said tube, said float having a stem extending through said cap and through said switch box, said switch box having one contact member adapted to be positioned in an electric circuit, including an audible signal, a contact member operatively connected to said stem so as to make contact with said first contact member when the float reaches a predetermined low position, said connecting means having a threaded nipple having a nut on one end within said tube, said threaded nipple passing through the cap and into the switch box and a nut on the end of the nipple within the switch box and bearing against the bottom of the switch box.

4. A device of the character described including in combination, a tube, a float slidably mounted within the tube, a cap member positioned on top of said tube and adapted to be secured to an inlet opening into a tank or reservoir, a switch box mounted on top of said cap, a nipple extending from said tube through said cap into said switch box and having securing means on each end, one being within the tube and the other being within the switch box, a stem on said float passing through said nipple and extending beyond said switch box, a stationary contact member in said switch box completely insulated from said device but adapted to be interposed in an electric circuit through an audible signal to a generator, a second contact member on said stem whereby when said float member drops to a predeterimned low level said second contact member will contact with the first contact member and complete the circuit through the audible signal to ground, the parts being rounded due to the connection with the tank.

5. A device of the character described including in combination, a tube, a float slidably mounted within the tube, a cap member positioned on top of said tube and adapted to be secured to an inlet opening into a tank or reservoir, a switch box mounted on top of said cap, a nipple extending from said tube through said cap into said switch box and having securing means on each end, one being within the tube and the other being within the switch box, a stem on said float passing through said nipple and extending beyond said switch box, a stationary contact member in said switch box completely insulated from said device but adapted to be interposed in an electric circuit through an audible signal to a generator, a second contact member on said stem whereby when said float member drops to a predetermined low level said second contact member will contact with the first contact member and complete the circuit through the audible signal to ground, the parts being grounded due to the connection with the tank, and means for adjusting said second mentioned contact member.

6. A device of the character described including, in combination, a tube adapted to be secured to an inlet opening into a tank or reservoir and having a float slidably mounted therein, a switch box positioned on top of said tube, an elongated nipple connecting said tube with said switch box, an elongated stem on said float passing through the nipple and extending beyond the switch box, a contact member in the switch box adapted to be interposed in an electric circuit through an audible signal, and a second contact member on said stem so positioned as to contact with the first contact member when the float reaches a predetermined low level.

In testimony that I claim the foregoing, I have hereunto set my hand this 8th day of July, 1925.

MERL HAINES.